Feb. 18, 1941.  R. A. WITTMANN  2,232,501
SAFETY DEVICE FOR GAS BURNERS
Filed Feb. 7, 1938  2 Sheets-Sheet 1
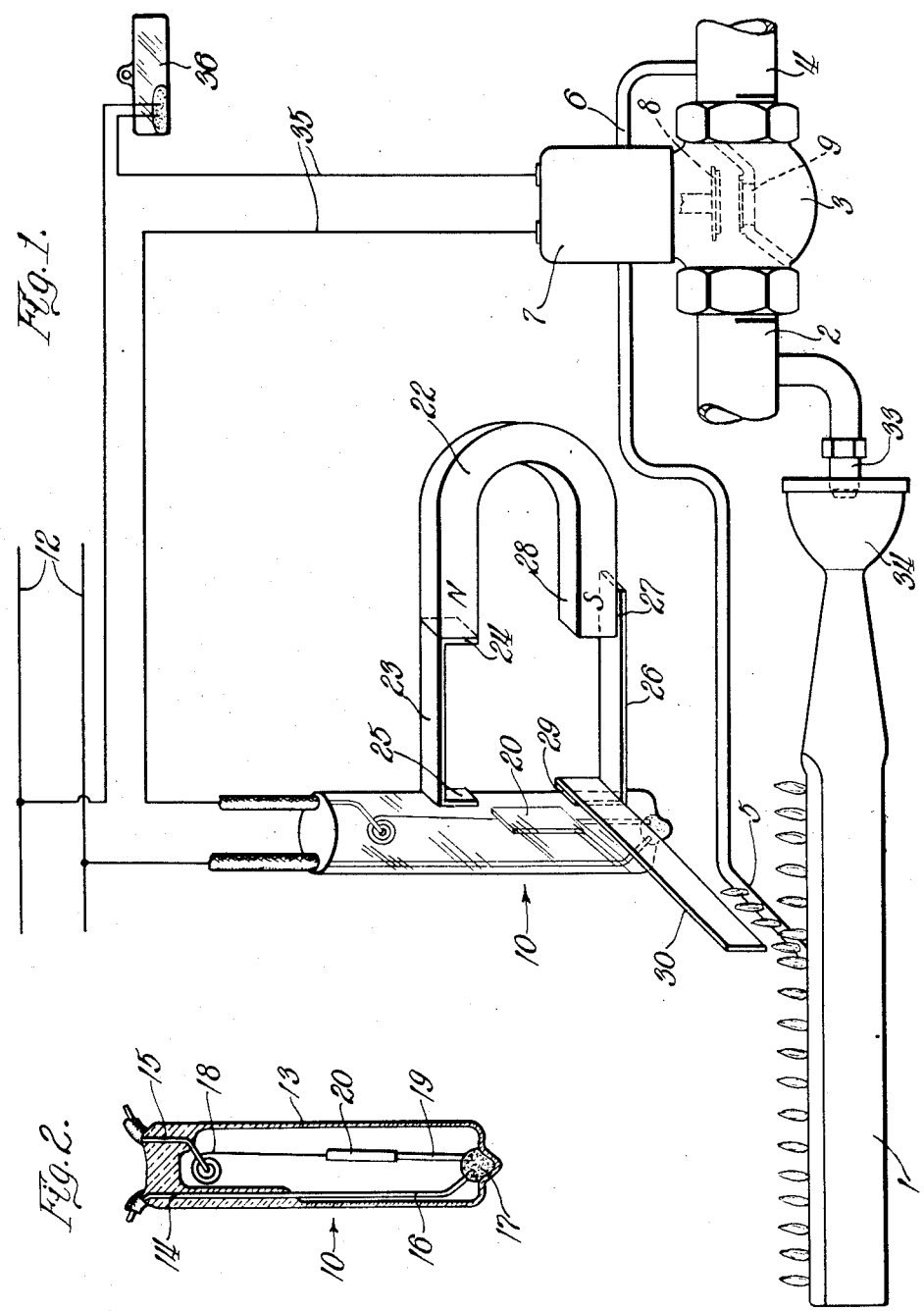
Inventor
Robert A. Wittmann Inventor
Robert A. Wittmann
By Brown Jackson Boettcher Dienner
Attys.

Patented Feb. 18, 1941

2,232,501

UNITED STATES PATENT OFFICE 2,232,501

SAFETY DEVICE FOR GAS BURNERS

Robert A. Wittmann, Chicago, Ill., assignor to Chicago By-Products Corporation, a corporation of Illinois Application February 7, 1938, Serial No. 189,120

4 Claims. (Cl. 200—88)

The present invention provides a safety device for gas burners wherein the main gas valve is closed off in the event that the pilot should go out. Like safety measures may be taken in respect to the main burner where no pilot burner is employed. The invention may be applied to other uses.

There have been on the market heretofore numerous gas safety pilots operating upon various principles, such as the use of a bulb and bellows filled with a gas (argon); the thermocouple operated by the heat of the pilot to energize a magnet coil; the use of bimetallic thermostats, with numerous applications and modifications; the use of the electron principle; and many others.

The present invention, which operates upon the principle of employing ferro-magnetic material having a suitable Curie point, makes possible certain functional and design advantages not heretofore attainable.

The principal object of the present invention is to provide a safety pilot control employing the principle of change in magnetic properties of a ferro-magnetic material in going to and from the Curie point. With the pilot control of my invention it is possible to light the pilot and put the system in operating condition in any desired period of time, preferably not sooner than thirty seconds. Thereby the operator is given ample time to move away from the main burner before it starts. The safety control of my invention will shut down or cause the shutting down of the main burner quickly when the pilot light is extinguished. Embodiments of my control have operated successfully and consistently to shut down operation three seconds after the pilot is extinguished, even with the main burner on.

A further object of my invention is to provide a safety pilot which is not provided with and does not require any adjustments. Such adjustments can and usually do get out of adjustment, as the prior art well knows.

A further object of my invention is to eliminate all exposed moving parts such as swivels, bearings, linkages, levers, springs, etc. All these are apt to cause faulty operation due to grain growth in the materials, rusting, corrosion, insufficient lubrication, improper assembly, faulty workmanship, and many other possible causes of failure.

A further object of my invention is to provide a safety pilot which is compact and simple from an assembly viewpoint, inexpensive to manufacture, and substantially universal in application.

Additional features of control may readily be added to or employed in conjunction with the present control.

Now in order to acquaint those skilled in the art with the manner of constructing and operating a device embodying my invention I shall describe, in conjunction with the accompanying drawings, a specific embodiment of the invention and the method of using the same.

In the accompanying drawings, in which like reference characters have been employed to designate like parts—

Figure 1 is a diagram of a safety pilot system embodying my invention;

Figure 2 is a vertical sectional view through the magnetic switch employed in conjunction with the system of Figure 1;

Figure 3:
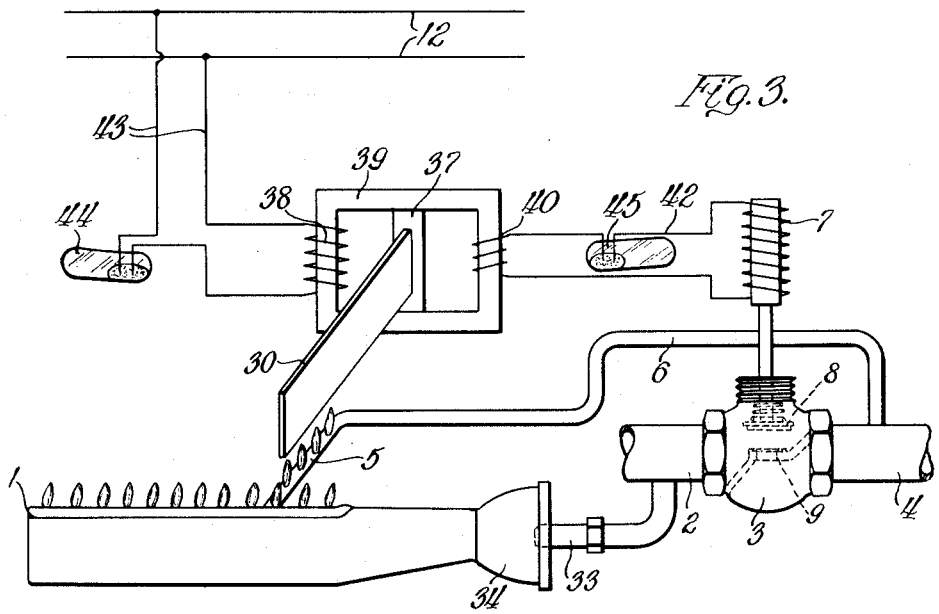
Figure 3 is a diagram of a modification embodying my invention.

Referring now to Figure 1, the main burner 1 is supplied from a gas supply pipe 2 which is connected through a shut-off valve 3 with a supply main 4. A pilot burner 5 for the main burner 1 is connected by a pipe 6 to the supply pipe 4 in advance of the shut-off valve 3. The shut-off valve is operated by an electromagnet 7 which, while energized, holds the valve plug or body 8 off of the seat or port 9, whereby gas may flow through the port and to the main burner 1 so long as the magnet 7 is energized.

The magnet 7 is under the control of an electric switch 10 which is in series with the circuit of the valve magnet 7. A suitable source of current such as house current is available through the conductors 12.

The switch 10 comprises a glass envelope 13 with a pair of sealed inleads 14 and 15, the inlead 14 continuing as a conductor 16 to the bottom of the envelope where, in a depression in the envelope, there is deposited a globule 17 of mercury with which the conductor 16 is at all times in contact.

The inlead 15 is connected to a coil spring conductor 18 which normally impels the lower or contact end 19 into engagement with the globule of mercury 17. This conductor 18 carries a magnetic armature 20 which, when attracted toward the adjacent wall of the envelope, causes the contacting portion 19 to leave the contact 17 and thereby open the circuit of the valve magnet 7.

This armature 20 is normally attracted to the open position by the magnetic field of the magnet 22, which may be either an electromagnet or a permanent magnet, and which is shown herein as a permanent magnet. A pole piece or extension 23 from the upper pole of the magnet 22 terminates at its adjacent end in an angular portion 24 which is secured to the adjacent pole face of the magnet 22. The remote end likewise terminates in a downwardly bent portion 25 which brings the end thereof adjacent to the magnetic armature 20 in the switch 10.

This polar extension 23 is preferably made of a ferro-magnetic material having a Curie point temperature somewhat above the normal ambient temperature of the medium in which it is disposed for operation.

The lower pole of the magnet 22 has disposed adjacent thereto a polar extension or pole piece 26 the adjacent end of which, as at 27, is spaced from the magnet pole 28 by a short air gap. The purpose of this air gap is mainly to avoid the transmission of heat from the member 26 to the magnet pole 28, by conduction.

At its opposite end the pole piece or extension 26 has an upturned terminal portion 29 which likewise is disposed adjacent the armature 20 in such relation that the magnetic field of the magnet 22 may be exerted at the terminal portions 25 and 29 to attract the armature 20 of the switch 10.

The polar extension 26 is also made of a suitable Curie point ferro-magnetic material the Curie point of which is selected to lie above the normal ambient temperature of the medium in which it is disposed for operation, so that it may lose heat to the surrounding medium in order to maintain its temperature below the Curie point and hence to retain its magnetic properties.

Normally, however, this polar extension is subject to the heat of the pilot burner 5 through the medium of a thermally conductive member 30 which, in the present instance, is a bar of material of fairly high heat conductivity, one end of which is disposed above the flame of the pilot burner 5 and the other end of which is securely fastened, as by welding or riveting, to the pole piece or extension 26, preferably at the upturned portion 29 thereof as indicated in Figure 1.

The relation of the parts is such that so long as the pilot burner is in operation the heat developed there is conducted by the thermally conductive member 30 to the polar extension 26 or a part thereof, this polar extension being thereby brought to a temperature substantially at or above the Curie point, whereby the polar extension 26 or a substantial part thereof is rendered non-magnetic and the field of the magnet 22 is no longer exerted upon the armature 20, with the result that it swings into the closed circuit position where the contact 19 engages the globule of mercury 17.

Thereby the circuit from the supply wires 12 to and through the valve magnet 7 is maintained energized and the valve body 8 is lifted from the seat 9, whereby gas may be supplied through the nozzle 33 and the mixer bell 34 to the burner 1. So long, therefore, as the pilot light 5 is in operation supplying heat to the conductor 30 and maintaining the polar extension 26 at or above the Curie point, the shut-off valve remains open.

In putting the system into operation the pilot light or burner 5 will within a very short time render the Curie point material 26 non-magnetic and allow the main valve to be opened. This delay allows the operator time to get away from the main burner or the vicinity thereof.

In case the pilot burner 5 goes out, as might be the case in the failure of gas pressure, the supply of heat to maintain the polar extension 26 above or at the Curie point fails. This Curie point material, during normal operation, is constantly throwing off heat at substantially the same rate at which it is received, so that a substantially fixed temperature is maintained in the Curie point material 26, holding it at or above the Curie point and hence rendering it non-magnetic. As soon as the supply of heat through the conductor 30 ceases due to failure of the pilot burner 5, the rejection of heat, or dissipation of it to the circumambient medium, quickly brings the polar extension 26 to a temperature where it recovers its magnetic properties and attracts the armature 20 through the extension of the field of the magnet 22 to the said armature, whereby the switch 10 is opened and the valve is allowed to close, or is closed by spring pressure, as may be desired.

The bar or conductor 30 need not be ferromagnetic. It should be either inherently free from corrosion by its composition or should be suitably coated to render it such, for its sole function is to conduct heat from the pilot burner 5 to the polar extension 26.

Obviously the location and arrangement of the heat conductor 30 with respect to the polar extension 26 may be varied. That is to say, it need not be disposed at the extreme end of the extension 26 although its effectiveness is, in the embodiment illustrated, substantially maximum at that point.

It is possible to eliminate the conductor 30 so long as the heat of the pilot burner 5 is conveyed to the Curie point material 26 or even to one pole of the magnet 22, where such heat is sufficient to cause it to lose its magnetic effect upon the armature 20.

The polar extension with the conductor 30 is desirable for several reasons. The magnet 22, for best effect, should be of a relatively fixed character, whereas the polar extensions may be made of any desired ferro-magnetic material having any desired Curie point to fit the particular purpose. Furthermore, these polar extensions may be made of a very small mass compared with the mass of the magnet, so that they may heat up and cool off relatively quickly. The two extensions 23 and 26 need not both be made of the same material. In fact, so long as one is made of Curie point material subject to the heat of the pilot burner, an adequate effect may be secured.

The polar extensions also permit the magnet to be placed at a convenient point with respect to the location of the switch 10.

Obviously, the polar extensions themselves might be employed directly as electric contacts and be attracted towards or separated from each other by change in the magnetic properties of either or both of them. By employing the conductive strip 30, the main portion of the control may be removed from the immediate vicinity of the pilot burner and the heat conveyed or conducted to the desired point of use.

The polar extensions 23 and 26 are preferably not directly in contact with the glass of the sealed mercury switch 10, in order to avoid the direct flow of heat between these parts.

While I have shown an evacuated and sealed mercury switch it is to be understood that an enclosed switch of any suitable design may be employed. Alternatively, a gravity switch may be mounted for relative movement, if desired, or an open type switch may be operated as above indicated.

It is to be observed that the circuit arrangement is such that if the electric current should fail the gas valve 3 would shut off, the system being thereby rendered automatically safe.

Various auxiliary controls may be combined with the control shown in Figure 1. For example, the conductor 30 may be extended on the opposite side of the polar extension 26 and be subjected to heat from another source, such, for example, as that of another burner, or from an electric heater or the like. Also, the circuit 35 of the magnet solenoid 7 may be subject to other controls, as, for example, through a switch 36 which may be made responsive to any other desired control condition. Also, a number of magnetic relays of the type shown in Figure 1 may be connected in series in the same circuit 35 for controlling the main shut-off valve 3.

The Curie point material may be, for example, Monel metal of a composition such as nickel, 67.74%; copper, 29.62%; iron, 2.92%. The Curie point of this composition is approximately 152° F. Another composition, known as "Midvale E. I. 562" may be used. This comprises a composition of nickel, 31.35%; chromium, 11.80%, and the remainder iron. Its Curie point lies at substantially 295° F. Another suitable material is known as "Jessop." It comprises nickel, 32.40%; iron, 66.91%; carbon, .14%, and a small amount of manganese. Its Curie point is substantially 291° F. Another material which may be used is "Invar." It comprises 36.00% nickel, and the remainder iron. Its Curie point lies at approximately 485° F.

The control which I have shown may be applied in various relations and it may be applied, for example, to the main burner itself, without a pilot. In fact, the thermal relay which I have shown may be employed in connection with any heater or heating system. Also, instead of having the Curie point material in series with the magnet 22, it may be employed as a shunt across the poles. Also, the Curie point material may form the armature or a part of the armature, where conditions are such as to permit its use in that manner. Obviously, the reverse relation of the parts, namely, a normally open circuit while the Curie point material is non-magnetic, may be employed. That is to say, the parts may be reversed without departing from my invention.

In Figure 3 I have illustrated a modification in which the thermal conductor 30 leads heat to a Curie point material shunt 37 which, while it is magnetic, serves as a return path for the magnetic flux established by the winding 38 in the core 39. That is to say, the shunt member 37 normally shuts out the winding 40 from the influence of the flux set up by the primary winding 38. Thereby the secondary circuit 42, which includes the solenoid winding 7 of the shut-off valve 3, is deenergized and the valve plug 8 closes the opening 9. However, the conductor 30, receiving heat from the lighted pilot burner 5, conveys this to the shunt 37 of the Curie point material and renders it non-magnetic, whereby the shunt action disappears or substantially disappears to the extent of allowing the magnetic flux of the core 39 to thread the coil 40 of the secondary circuit 42 and energize the solenoid 7 to open the valve 8.

Obviously, either the primary circuit 43 or the secondary circuit 42 may be subject to interruption by auxiliary controls, as indicated by the switches 44 and 45.

The operation of this embodiment is apparent from the above description, namely, that to set the system in operation, proceed as follows: The primary circuit 43 being closed and supplied with energy from the wires 12, and the shunt 37 being magnetic, the flux set up by the primary winding 38 is shielded from the secondary winding 40 by the action of the shunt 37. The valve 8 thereby closes the port 9 and the shut-off valve 3. When the pilot light 5 is lighted and the heat thereof is conducted by the conductor 30 to the shunt 37, its Curie point is reached and it is maintained at a temperature at or above the Curie point, whereby it remains non-magnetic so long as the pilot light 5 is on. Thereby the secondary winding 40 is energized and, in turn, the solenoid 7 raises the valve plug 8 from the port 9, permitting gas to be delivered to the main burner 1. This condition proceeds. The heat conducted to the shunt 37 is thrown off to the circumambient medium, but the temperature gradient is such that the Curie point material shunt 37 remains non-magnetic. If and when the pilot light 5 ceases to function, the conductors 30 no longer receives heat and it, as well as the shunt 37, may then dissipate heat to the surrounding medium, quickly restoring the shunt 37 to its magnetic state, where it becomes effective in respect to the winding 40 and causes deenergization of the coil 7, with consequent operation of the shut-off valve 3 to close down the main burner 1.

Figure 4:
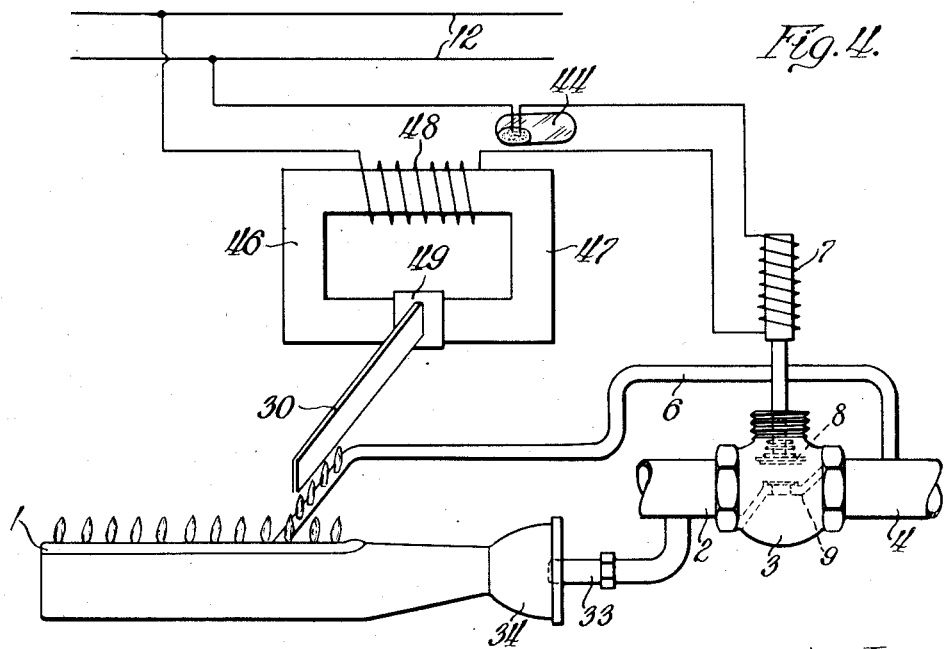
Figure 4 is a diagram of a further modification.

In Figure 4 I have shown a further modification in which the solenoid coil 7 is in series with an inductance 46 comprising a core 47 upon which is wound a coil 48 in series relation between the supply wire 12 and the solenoid winding 7 of the shut-off valve 3. A portion of the magnetic core 47 is formed of the Curie point material 49, and it has the conductor 30 extending over the pilot burner 5 in substantially the relation shown in Figure 3. In this case the Curie point material 49 is in series relation with the flux set up by the winding 48, hence rendering the Curie point material 49 non-magnetic, opens the magnetic circuit 47 and allows a greater flow of current through the coil 48, with consequent operation of the solenoid 7 to open the shut-off valve 3. Conversely, as soon as the pilot light 5 is extinguished, the conductor 30 no longer maintains the temperature of the Curie point material 49 at or above the Curie point, with the result that it becomes magnetic and the flow of current through the winding 48 is choked, thereby allowing the solenoid core to drop the valve 8 upon its port 9 and shutting off the main burner 1.

This control may be modified by the introduction of a switch such as 44 subject to another operating condition as desired.

I do not intend to be limited to the details shown and described except as they are recited in the appended claims, as I believe that the employment of the Curie point material as a control, in conjunction with a safety pilot or similar safety control, operating in conjunction with heating means, is broadly new.

I claim:

1. In combination a permanent horse shoe magnet having substantially parallel limbs, stationary magnetic extensions of said limbs, said extensions lying in a substantially vertical plane, an armature subject to the flux through said extensions, one of said extensions comprising a stationary flat bar of Curie point material disposed in magnetic conductive relation with the corresponding limb of said magnet, and a conducting bar of good heat conducting metal in thermally conductive relation to said bar of Curie point material and extending at substantially right angles to the plane of said extensions whereby the outer end of the bar may readily be subjected to the heat of a pilot flame and electric contacts controlled by said armature.

2. A flame responsive relay comprising an armature and electric contacts governed thereby enclosed in a hermetically sealed shell, a magnet for attracting said armature, a polar extension for said magnet extending from a point adjacent a pole of the magnet to a point adjacent the shell, and serving when diamagnetic to permit the magnet to attract said armature, said extension comprising Curie point material which when heated above a predetermined temperature is paramagnetic, and thereby prevents the armature from being attracted, and a heat conductive bar adapted to be disposed in substantially a horizontal position and substantially transverse to the said polar extension having its outer end adapted to be disposed over a pilot burner, and its inner end in good thermally conductive relation to said extension, whereby the magnet, polar extension, armature and contacts may be disposed out of the region of the burner.

3. A flame responsive relay comprising means providing a substantially closed magnetic path, said means including a stationary body of Curie point material forming a part of said magnetic path and being diamagnetic at room temperature, a heat conducting bar in good heat conductive contact with said body and extending transversely to said magnetic path, the outer end of said bar being adapted to be disposed in substantially horizontal position over a pilot gas burner, said bar being adapted when heated by a pilot flame to conduct heat to said body and to render the same paramagnetic, and means including an electric circuit controlled by the aforesaid change in magnetic permeability of said body.

4. In a flame responsive relay magnetizing means for producing magnetic flux, means responsive to magnetic flux, a stationary magnetic member of Curie point metal controlling the application of said flux to said responsive means, and having a longitudinal axis extending in the direction of the magnetic flux, and a heat conductive bar adapted to be disposed over the flame to which it is responsive, said bar being disposed in good heat conducting relation to the member of Curie point metal and with its longitudinal axis transverse to the longitudinal axis of the said member.

ROBERT A. WITTMANN.